United States Patent
Jen et al.

(10) Patent No.: US 8,565,569 B2
(45) Date of Patent: Oct. 22, 2013

(54) METHODS FOR PRODUCING ELECTRO-OPTIC ACTIVITY IN ORGANIC NONLINEAR OPTICAL MATERIALS USING AN ELECTROSTATIC FIELD GENERATED BY A PYROELECTRIC OR A FERROELECTRIC MATERIAL

(75) Inventors: Alex Kwan-yue Jen, Kenmore, WA (US); Antao Chen, Lake Forest Park, WA (US); Su Huang, Seattle, WA (US); Jingdong Luo, Shoreline, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 329 days.

(21) Appl. No.: 12/906,305

(22) Filed: Oct. 18, 2010

(65) Prior Publication Data

US 2011/0091149 A1    Apr. 21, 2011

Related U.S. Application Data

(60) Provisional application No. 61/252,560, filed on Oct. 16, 2009.

(51) Int. Cl.
*G02B 6/10* (2006.01)
*G02B 6/00* (2006.01)
*G02B 6/036* (2006.01)

(52) U.S. Cl.
USPC ......................................................... 385/129

(58) Field of Classification Search
USPC ............. 385/12–15, 129–132, 140, 147, 2–4; 264/1.27, 435, 449, 85; 205/118, 122
See application file for complete search history.

(56) References Cited

U.S. PATENT DOCUMENTS

| | | | |
|---|---|---|---|
| 6,558,585 B1 | 5/2003 | Zhang | |
| 7,307,173 B1 * | 12/2007 | Jen et al. | 548/400 |
| 7,749,408 B2 * | 7/2010 | Jen et al. | 252/582 |
| 2007/0152198 A1 * | 7/2007 | Jen et al. | 252/582 |
| 2007/0297708 A1 | 12/2007 | Peyghambarian | |
| 2008/0004415 A1 * | 1/2008 | McGinniss et al. | 528/26 |
| 2008/0128618 A1 | 6/2008 | Rahman | |
| 2009/0118521 A1 * | 5/2009 | Jen et al. | 549/4 |
| 2011/0318554 A1 * | 12/2011 | Nagashima et al. | 428/212 |

OTHER PUBLICATIONS

Baehr-Jones, T, et al., "Nonlinear Polymer-Clad Silicon Slot Waveguide Modulator With a Half Wave Voltage of 0.25 V," Applied Physics Letters 92(16):163303-1-163303-3, Apr. 2008.
Block, B.A., et al., "Electro-Optic Polymer Cladding Ring Resonator Modulators," Optics Express 16(22):18326-18333, Oct. 2008.
McLaughlin, C.V., et al., "Wideband 15 THz Response Using Organic Electro-Optic Polymer Emitter-Sensor Pairs at Telecommunication Wavelengths," Applied Physics Letters 92:151107-1-151107-3, 2008.
Rosenman, G., and D. Shur, "Electron Emission from Ferroelectrics," Journal of Applied Physics 88(11):6109-6161, Dec. 2000.

(Continued)

*Primary Examiner* — Akm Enayet Ullah
(74) *Attorney, Agent, or Firm* — Christensen O'Connor Johnson Kindness PLLC

(57) ABSTRACT

Poling structures and methods utilizing an electrostatic field generated from a polar dielectric material, including pyroelectric and ferroelectric materials, to produce electro-optic activity in organic nonlinear optical materials.

13 Claims, 6 Drawing Sheets

(56) References Cited

OTHER PUBLICATIONS

Sun, H., et al., "All-Dielectric Electrooptic Sensor Based on a Polymer Microresonator Coupled Side-Polished Optical Fiber," IEEE Sensors Journal 7(4):515-524, Apr. 2007.
Tazawa, H., et al, "Ring Resonator-Based Electrooptic Polymer Traveling-Wave Modulator," Journal of Lightwave Technology 24(9):3514-3519, Sep. 2006.
Agrawal, R., et al., "Thickness Dependence of Space Charge Limited Current and Injection Limited Current in Organic Molecular Semiconductors," Applied Physics Letters 93(7):073311-1-073311-3, Aug. 2008.
Arkhipov, V.I., et al., "Charge Injection Versus Space-Charge-Limited Current in Organic Light-Emitting Diodes," Applied Physics Letters 83(24):5074-5076, Dec. 2003.
Baehr-Jones, T., and M. Hochberg, "Silicon Photonics: Slot Machine," Nature Photonics 3(4):193-194, Apr. 2009.
Bang, S., et al., "$Al_2O_3$ Buffer in a ZnO Thin Film Transistor With Poly-4-Vinylphenol Dielectric," Semiconductor Science and Technology 24(2):1-6, Feb. 2009.
Bartnikas, R., "Dielectric Loss in Insulating Liquids," IEEE Transactions on Electrical Insulation EI-2(1):33-54, Apr. 1967.
Blum, R. et al., "High-Electric-Field Poling of Nonlinear Optical Polymers," Journal of the Optical Society of America B: Optical Physics 15(1):318-328, Jan. 1998.
Borsenberger, P.M., et al., "Charge Transport in Disordered Molecular Solids," Journal of Chemical Physics 94(8):5447-5454, Apr. 1991.
Brownridge, J.D., and S.M. Shafroth, "Self-Focused Electron Beams Produced by Pyroelectric Crystals on Heating or Cooling in Dilute Gases," Applied Physics Letters 79(20):3364-3366, Nov. 2001.
Burland, D.M., et al., "Second-Order Nonlinearity in Poled-Polymer Systems," Chemical Reviews 94(1):31-75, Jan. 1994.
Chen, H., et al., "Broadband Electro-Optic Polymer Modulators With High Electro-Optic Activity and Low Poling Induced Optical Loss," Applied Physics Letters 93(4):043507-1-043507-3, Jul. 2008.
DeRose, C.T., et al., "Pockel's Coefficient Enhancement of Poled Electro-Optic Polymers With a Hybrid Organic-Inorganic Sol-Gel Cladding Layer," Applied Physics Letters 89(13):131102-1-131102-3, Sep. 2006.
Dong, P., et al., "Low Vpp, Ultralow-Energy, Compact, High-Speed Silicon Electro-Optic Modulator," Optics Express 17(25):22484-22490, Dec. 2009.
Drummond, J.P., et al., "Enhanced Electro-Optic Poling in Guest-Host Systems Using Conductive Polymer-Based Cladding Layers," Applied Physics Letters 74(3):368-370, Jan. 1999.
Dunlap, D.H., et al., "Charge-Dipole Model for the Universal Field Dependence of Mobilities in Molecularly Doped Polymers," Physical Review Letters 77(3):542-545, Jul. 1996.
Ehre, D., et al., "Water Freezes Differently on Positively and Negatively Charged Surfaces of Pyroelectric Materials," Science 327(5966):672-675, Feb. 2010.
Enami, Y., et al., "Hybrid Polymer/Sol-Gel Waveguide Modulators With Exceptionally Large Electro-Optic Coefficients," Nature Photonics 1:180-185, Mar. 2007.
Ferraro, P., et al., "Wettability Patterning of Lithium Niobate Substrate by Modulating Pyroelectric Effect to Form Microarray of Sessile Droplets," Applied Physics Letters 92(21):213107-1-213107-3, May 2008.
Fullem, T.Z., and Y. Danon, "Electrostatics of Pyroelectric Accelerators," Journal of Applied Physics 106(7):074101-1-074101-6, 2009.
Garrity, K, et al., "Chemistry of Ferroelectric Surfaces," Advanced Materials 22(26-27):2969-2973, Jul. 2010.
Geuther, J., et al., "Nuclear Reactions Induced by a Pyroelectric Accelerator," Physical Review Letters 96(5):054803-1-054803-4, Feb. 2006.
Gould, M., et al., "Silicon-Polymer Hybrid Slot Waveguide Ring-Resonator Modulator," Optics Express 19(5):3952-3961, Feb. 2011.
Grätzel, M., "Photoelectrochemical Cells," Nature 414:338-344, Nov. 2001.
Grote, J.G., et al., "Effect of Conductivity and Dielectric Constant on the Modulation Voltage for Optoelectronic Devices Based on Nonlinear Optical Polymers," Optical Engineering 40(11)2464-2473, Nov. 2001.
Hassan, A.K., et al., "Structural and Electrical Studies on Sol-Gel Derived Spun $TiO_2$ Thin Films," Journal of Physics D: Applied Physics 36(9):1120-1125, Apr. 2003.
Hau, S.T., et al., "Interfacial Modification to Improve Inverted Polymer Solar Cells," Journal of Materials Chemistry 18(42):5113-5119, Nov. 2008.
Hill, R.A., et al., "Corona Poling of Nonlinear Polymer Thin Films for Electro-Optic Modulators," Applied Physics Letters 65(14):1733-1735, Oct. 1994.
Hochberg, M., and T. Baehr-Jones, "Towards Fabless Silicon Photonics," Nature Photonics 4:492-494, Aug. 2010.
Kao, K.C., "Dielectric Phenomena in Solids," Elsevier, San Diego, 2004, Chap. 2, "Electric Polarization and Relaxation," p. 49.
Kim, T.-D., et al., "Binary Chromophore Systems in Nonlinear Optical Dendrimers and Polymers for Large Electrooptic Activities," Journal of Physical Chemistry C 112(21):8091-8098, May 2008.
Lang, S.B., "Pyroelectricity: From Ancient Curiosity to Modern Imaging Tool," Physics Today 58(8):31, Aug. 2005.
Leuthold, J., et al., "Nonlinear Silicon Photonics," Nature Photonics 4:535-544, Aug. 2010.
Li, D., et al., "Direct In Situ Determination of the Polarization Dependence of Physisorption on Ferroelectric Surfaces," Nature Materials 7(6):473-477, Jun. 2008.
Montanari, G.C., and P.H.F. Morshuls, "Space Charge Phenomenology in Polymeric Insulating Materials," IEEE Transactions on Dielectrics and Electrical Insulation 12(4):754-767, Aug. 2005.
Mortazavi, M.A., et al., "Second-Harmonic Generation and Absorption Studies of Polymer-Dye Films Oriented by Corona-Onset Poling at Elevated Temperatures," Journal of the Optical Society of America B: Optical Physics 6(4):733-741, Apr. 1989.
Müller, K., et al., "A Polymer High-κ Dielectric Insulator for Organic Field-Effect Transistors," Journal of Applied Physics 98(5):056104-1-056104-3, Sep. 2005.
Naranjo, B., et al., "Observation of Nuclear Fusion Driven by a Pyroelectric Crystal," Nature 434(7037):1115-1117, Apr. 2005.
Park, D.H., et al., "Analysis of Multiple Reflection Effects in Reflective Measurements of Electro-Optic Coefficients of Poled Polymers in Multilayer Structures," Optics Express 14(19):8866-8884, Sep. 2006.
Sprave, M., et al., "High Electric Field Conduction Mechanisms in Electrode Poling of Electro Optic Polymers," Applied Physics Letters 69(20):2962-2964, Nov. 1996.
Teng, C.C., and H.T. Man, "Simple Reflection Technique for Measuring the Electro-Optic Coefficient of Poled Polymers," Applied Physics Letters 56(18):1734-1736, Apr. 1990.
Teng, C.C., et al., "Origin of the Poling-Induced Optical Loss in a Nonlinear Optical Polymeric Waveguide," Applied Physics Letters 66(6):667-669, Feb. 1995.
Watanabe, Y., et al., "Surface Conduction on Insulating $BaTiO_3$ Crystal Suggesting an Intrinsic Surface Electron Layer," Physical Review Letters 86(2):332-335, Jan. 2001.
Yun, Y., and E. Altman, "Using Ferroelectric Poling to Change Adsorption on Oxide Surfaces," Journal of the American Chemical Society 129(50):15684-15689, Dec. 2007.

* cited by examiner

METHODS FOR PRODUCING ELECTRO-OPTIC ACTIVITY IN ORGANIC NONLINEAR OPTICAL MATERIALS USING AN ELECTROSTATIC FIELD GENERATED BY A PYROELECTRIC OR A FERROELECTRIC MATERIAL

CROSS-REFERENCE(S) TO RELATED APPLICATION(S)

This application claims priority to and the benefit of co-pending U.S. provisional patent application Ser. No. 61/252,560, filed Oct. 16, 2009, which application is incorporated hereby reference in its entirety.

FIELD OF THE INVENTION

The present invention relates to poling structures and methods for producing electro-optic activity in organic nonlinear optical materials by utilizing the electrostatic field generated from polar dielectric materials.

BACKGROUND

Organic second-order nonlinear optical (NLO) materials have generated a great deal of interest for use in modulators, optical interconnects, and other devices due to their large linear electro-optic (EO) coefficients and processing techniques that are compatible with integrated circuit technology. Macroscopic NLO effects in these materials are realized by permanently orienting the dipole moments of chromophores to introduce asymmetry to the materials. Electric field poling, a commonly used procedure to drive such organization, involves heating thin films of materials to the glass-rubber transition temperature ($T_g$), applying an electric field to orient the chromophores, and cooling the films while the field is still applied. Two common methods of electric field poling are contact poling and corona poling.

A typical contact poling configuration is illustrated in FIG. 1. Referring to FIG. 1, contact poling configuration 100 is provided having substrate 110, transparent first electrode 120 disposed on a surface of substrate 110, organic NLO material layer 130 disposed on a surface of first electrode 120 opposite the substrate 110, and second electrode 140 disposed on a surface of organic NLO material layer 130 opposite first electrode 120. Temperature is controlled by heaters 150 and 155 in combination with thermocouple 160 and temperature controller 170. Voltage source 180 connected to first electrode 120 and second electrode 140. Poling structure 100 is positioned within poling chamber 102 having gas inlet 104 through which nitrogen is passed to create an oxygen and moisture free environment. Contact poling uses highly conductive electrodes in contact with the NLO film of organic materials to apply a large electric field (R. Blum, M. Sprave, J. Sablotny, and M. Eich, *J. Opt. Soc. Am.* B, 15, 318-328 (1998)). Poling electrodes can cover a large area and can provide a relatively uniform poling field strength across the poled area. However, the configuration of contact poling provides a path of high lateral conductivity that results in large destructive current densities at pinhole defects. The increased conductivity of materials in the vicinity of $T_g$ also compounds this problem. Particular care must be taken during the preparation of thin films to prevent the morphological defects, and in-situ monitoring of leakage through current during the poling process is often needed to avoid the avalanche breakdown and reduce the poling induced optical loss of the films ((a) Y. Enami, C. T. DeRose, C. Loychik, D. Mathine, R. A. Norwood, J. Luo, A. K-Y. Jen, N. Peyghambarian, *Appl. Phys. Lett.* 89, 143506/1-3 (2006); (b) H. Chen, B. Chen, D. Huang, D. Jin, J. D. Luo, A. K-Y. Jen, R. Dino, *Appl. Phys. Lett.* 93, 043507/1-3 (2008)).

A typical corona poling setup is illustrated in FIG. 2. Referring to FIG. 2, corona poling configuration 200 is provided having first electrode 220 connected to the ground, substrate 210 laminated on a surface of first electrode 220, organic NLO material layer 230 disposed on a surface of substrate 210 opposite first electrode 220. Temperature is controlled by heater 240 in combination with thermocouple 250 and temperature controller 260. In this configuration, needle, wire, or grid 270 is charged by voltage source 280 to several kilovolts until electric breakdown of the surrounding atmosphere occurs (M. A. Mortazavi, A. Knoesen, S. T. Kowel, B. G. Higgins, and A. Dienes, *J. Opt. Soc. Am.* B 6, 733-741 (1989)). Depending on the polarity of the corona needle, either positive or negative ions can be deposited on the surface of the polymer film. By exposing a NLO film to a corona discharge, poling electric fields close to the dielectric breakdown can be obtained. NLO films deposited directly onto glass substrates can be poled with this method to yield large areas of poled films. The NLO films do not have to satisfy the stringent requirements of contact poling because highly conductive surfaces are not in close proximity to the NLO films. Large poling fields can be obtained by corona poling, leading directly to large optical nonlinearities. Corona poling has the disadvantage of not permitting simple measurement of the poling field strength, and the problem of surface damage due to the presence of a variety of chemically reactive and physically energetic species in the corona discharge (R. A. Hill, A. Knoesen, M. A. Mortazavi, *Appl. Phys. Lett.* 65, 1733-1735 (1994)).

Although contact and corona poling can generate non-centrosymmetric order of NLO materials, both techniques impose considerable limitation and challenges to the potential application of these materials. Certain applications of electro-optic modulator technology require dense packaging of a large number of modulators and the integration of individual modulators with very large-scale integration (VLSI) semiconductor electronics and a variety of passive and active optical circuit elements (S. Kalluri, M. Ziari, A. Chen, V. Chuyanov, W. H. Steier, D. Chen, B. Jalali, H. Fetterman, L. R. Dalton, *IEEE Photonics Technology Letters* 8, 644-646 (1996)).

Degradation of the electronics during the high field poling and modulator fabrication processes has been a serious concern. A need exists for methods for poling chromophore-containing NLO films without damaging neighboring semiconductor circuitry. Significant challenges also exist in integrating these high activity materials into the silicon nanophotonic devices, such as slotted waveguides and photonic crystals, which has been driving the high level of research interest due to this system's intrinsic compatibility with electronics in a cost-effective manner. The highest activity of organic EO materials that has been realized to date in a slotted silicon waveguide is around 30 pm/V (T. Baehr-Jones, B. Penkov, J. Huang, P. Sullivan, J. Davies, J. Takayesu, J. Luo, T.-D. Kim, L. Dalton, A. Jen, M. Hochberg, and A. Scherer, *Appl. Phys. Lett.* 92, 163303/1-3 (2008)). This is a result of challenges with poling and charge injection at the interface, and it has emerged that poling in these nanoscale waveguides is a significantly different problem from that of poling larger all-organic or sol-gel/organic devices (T. W. Baehr-Jones, M. J. Hochberg, *J. Phys. Chem.* C 112, 8085-8090 (2008)).

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention relates to poling structures and methods for producing electro-optic activity in organic NLO materials by utilizing the electrostatic field generated from polar dielectric materials.

In one aspect, the present invention provides poling structures for better utilizing the electrostatic field generated from the polar dielectric material to produce large EO activity in organic NLO materials.

In one embodiment, the poling structure includes a first assembly comprising a substrate, a first electrode disposed on a surface of the substrate, an organic NLO material layer disposed on a surface of the first electrode opposite the substrate, and a second electrode disposed on a surface of the organic NLO material layer opposite the first electrode; and a second assembly comprising a dielectric material for generating a poling electrostatic field.

In another embodiment, the poling structure includes a first assembly comprising a substrate, a first electrode disposed on a surface of the substrate, an organic NLO material layer disposed on a surface of the first electrode opposite the substrate, and a second electrode disposed on a surface of the organic NLO material layer opposite the first electrode; and a second assembly comprising a dielectric material for generating a poling electrostatic field; and a third electrode disposed on a surface of the dielectric material.

In another embodiment, the poling structure includes a first assembly comprising a substrate, a first electrode disposed on a surface of the substrate, and an organic NLO material layer disposed on a surface of the first electrode opposite the substrate; and a second assembly comprising a dielectric material for generating a poling electrostatic field, and a second electrode disposed on a surface of the dielectric material.

In another embodiment, the poling structure includes a first assembly comprising a substrate, and a first electrode disposed on a surface of the substrate; and a second assembly comprising a dielectric material for generating a poling electrostatic field, a second electrode disposed on a surface of the dielectric material, and an organic NLO material layer disposed on a surface of the second electrode opposite the dielectric material.

In another embodiment, the poling structure includes a first assembly comprising a substrate, a first electrode disposed on a surface of the substrate, and a first organic NLO material layer disposed on a surface of the first electrode opposite the substrate; and a second assembly comprising a dielectric material for generating a poling electrostatic field, a second electrode disposed on a surface of the dielectric material, and a second organic NLO material layer disposed on a surface of the second electrode opposite the dielectric material.

In another embodiment, the poling structure includes a first assembly comprising a first dielectric material having a first polarization direction, a substrate laminated on a surface of the first dielectric material, a first electrode disposed on a surface of the substrate opposite the first dielectric material, and a first organic NLO material layer disposed on a surface of the first electrode opposite the substrate; and a second assembly comprising a second dielectric material having a second polarization direction for generating a poling electrostatic field, wherein the second dielectric material has the same polarization direction as the first dielectric material, a second electrode disposed on a surface of the second dielectric material, and a second organic NLO material layer disposed on a surface of the second electrode opposite the second dielectric material.

In another embodiment, the poling structure includes a first assembly comprising a first dielectric material substrate having the first polarization direction, a first metal electrode disposed on a surface of the first dielectric material, wherein the first metal electrode has reflectivity of at least 99%, an organic NLO material layer disposed on a surface of the first metal electrode opposite the first dielectric material, and a second metal electrode disposed on a surface of the organic NLO material layer opposite the first metal electrode, wherein the second metal electrode has reflectivity of at least 99%; and a second assembly comprising a second dielectric material having a second polarization direction for generating a poling electrostatic field, wherein the second dielectric material has the same polarization direction as the first dielectric material.

In another aspect, the present invention provides methods for producing EO activity in organic NLO materials by poling organic NLO materials under an electrostatic field generated from a polar dielectric material. In one embodiment, the electrostatic field is generated from a pyroelectric or a ferroelectric material by heating or cooling of the pyroelectric or the ferroelectric material. In another embodiment, the electrostatic field is generated from a piezoelectric, a pyroelectric, or a ferroelectric material by applying stress to the piezoelectric, the pyroelectric, or the ferroelectric material. In another embodiment, the electrostatic field is generated from a ferroelectric material by applying electric field to the ferroelectric material.

In a further aspect, the present invention provides EO devices that comprise optical waveguides having the poled organic NLO material layer obtained by utilizing the poling structures and methods of the invention. Representative devices include EO modulators, optical switches, optical electric field sensors, and terahertz emitters.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

The invention provides a new approach to achieve large EO activity in organic NLO materials and to address the challenging issues encountered in the commonly adopted poling methods, such as contact poling and corona poling. It has been discovered that the polarization change of noncentrosymmetric crystals can provide an electric field as high as $10^{8-10}$ V/m near its surface (G. Rosenman, D. Shur, Y. E. Krasik, Y. Dunaevsky, J. Appl. Phys. 88, 6109 (2000); H. Riege, I. Boscolo, J. Handerek, U. Herleb, J. Appl. Phys. 84, 1602 (1998)). In the devices and methods of the invention, the effective field generated from controllable polarization change of polar dielectrics is used to produce a non-centrosymmetric order of NLO chromophores, leading to materials having large EO activity. Electrostatic field generation and induced electron emission results from the polarization of polar dielectrics by deviation from the equilibrium state under pyroelectric, piezoelectric effects, or polarization reversal. These methods do not require external voltage power supplies and electrodes to pole highly nonlinear organic materials.

The devices and methods of the invention can be widely applied to the processing of organic and polymeric NLO materials in a variety of optoelectronic and photonic devices, including electro-optic modulators, silicon-organic hybrid waveguides, optical electric field sensors, new frequency generation, and all-optical switches. It may also be applied to the exploration of new electro-optic and photonic devices based on all dielectric materials.

As used herein, the term "poling" refers to orienting electric dipoles to at least some extent in a material by applying an electric field to the material.

A "poled" material refers to a material in which the electric dipoles have a net orientation or alignment, instead of a random orientation.

In one aspect, the present invention provides poling structures for better utilizing an electrostatic field generated from a polar dielectric material to produce large EO activity in organic NLO materials. Representative poling structures of the invention are schematically shown in cross-sectional views in FIGS. 3-10.

Figure 1:
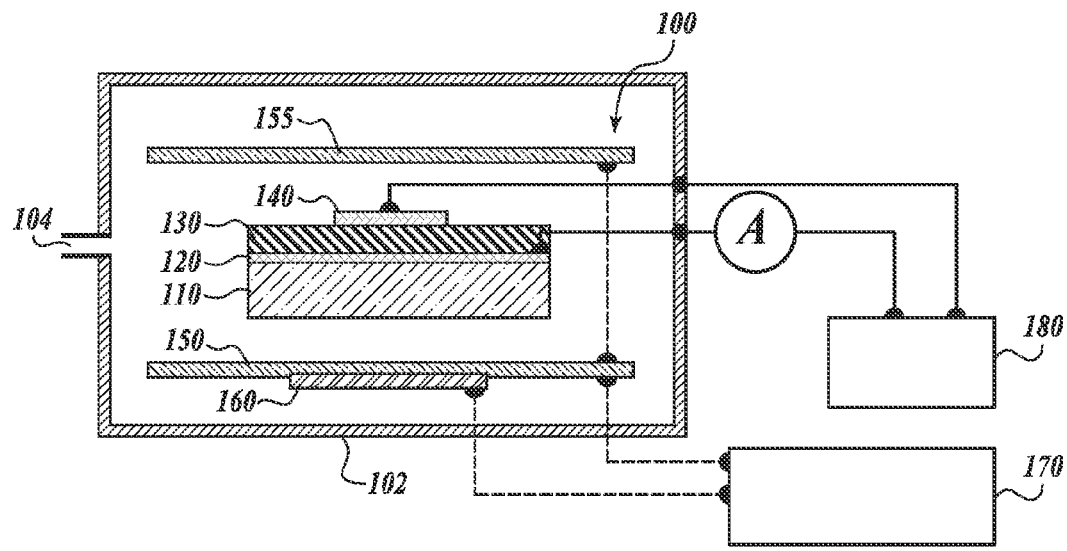
FIG. 1 is a contact poling configuration for organic NLO materials.
Figure 2:
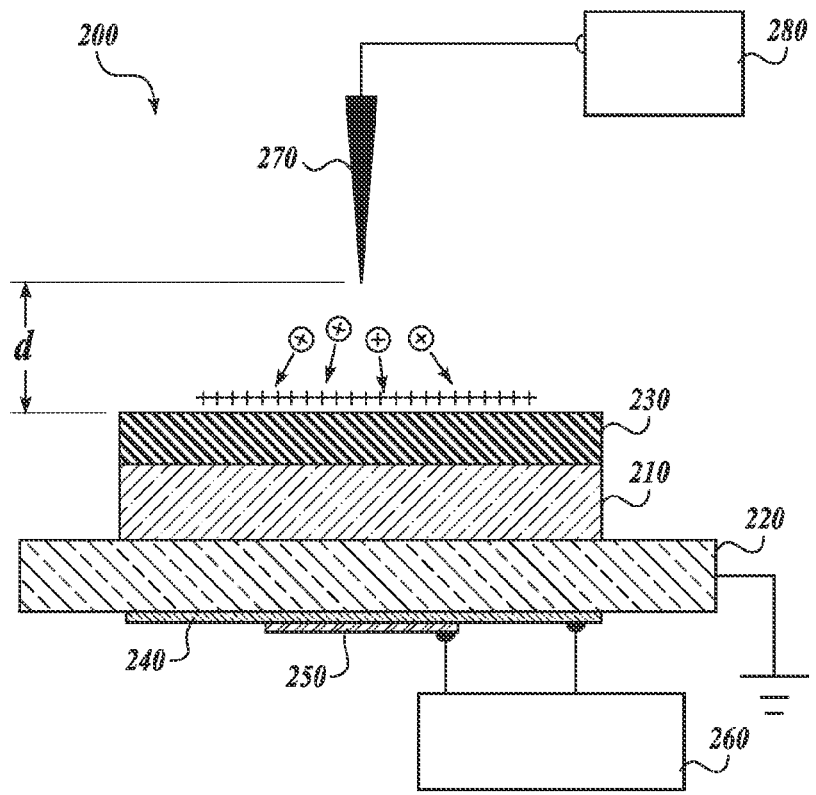
FIG. 2 is a corona poling configuration for organic NLO materials.
Figure 3:
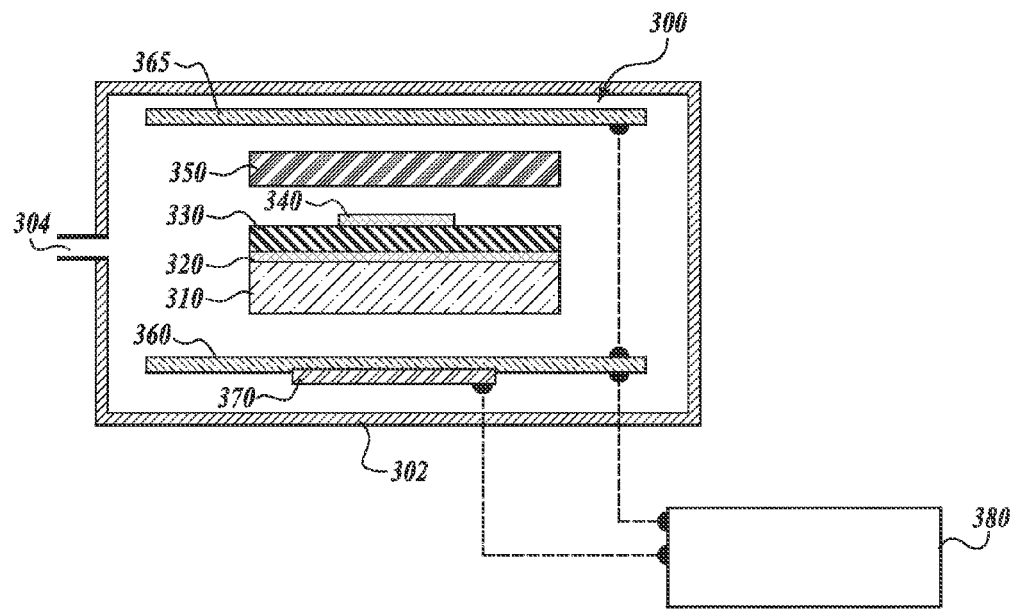
FIG. 3 is a cross-sectional view of a representative poling structure of the invention.

Referring to FIG. 3, poling structure 300 is provided having a first assembly comprising substrate 310, transparent first electrode 320 disposed on a surface of substrate 310, organic NLO material layer 330 disposed on a surface of first electrode 320 opposite the substrate 310, and second electrode 340 disposed on a surface of organic NLO material layer 330 opposite first electrode 320; and a second assembly comprising dielectric material 350 for generating a poling electrostatic field. Temperatures of the first and second assemblies are raised by first heater 360 and second heater 365, respectively, in combination with thermocouple 370 and temperature controller 380. Poling structure 300 is positioned within poling chamber 302 having gas inlet 304 through which a nitrogen is passed to create an oxygen and moisture free environment.

Figure 4:
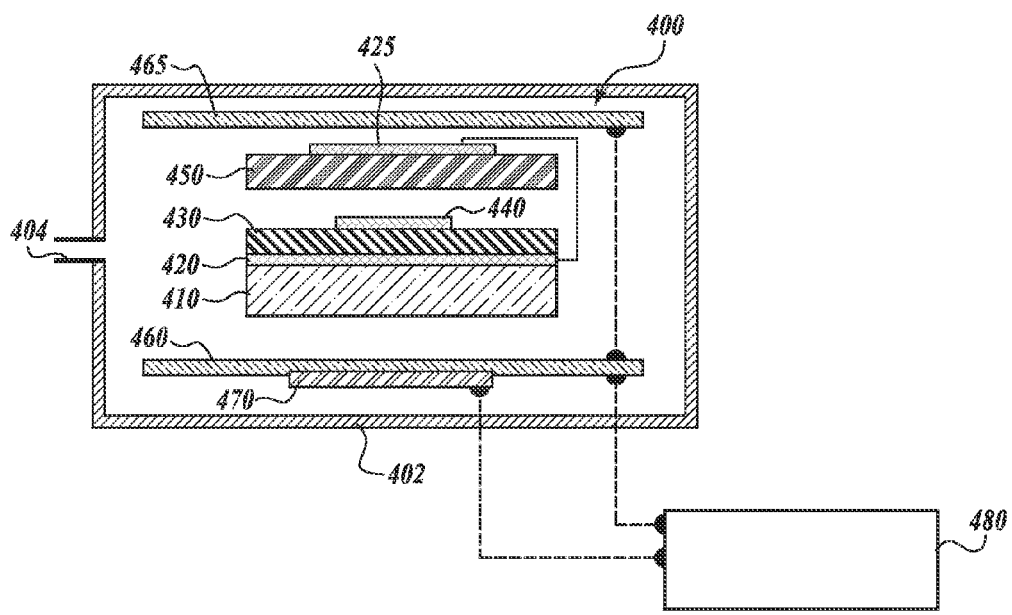
FIG. 4 is a cross-sectional view of a representative poling structure of the invention.

Referring to FIG. 4, poling structure 400 is provided having a first assembly comprising substrate 410, transparent first electrode 420 disposed on a surface of substrate 410, organic NLO material layer 430 disposed on a surface of first electrode 420 opposite the substrate 410, and second electrode 440 disposed on a surface of organic NLO material layer 430 opposite first electrode 420; and a second assembly comprising dielectric material 450 for generating a poling electrostatic field, and third electrode 425 disposed on a surface of dielectric material 450 and connected to first electrode 420. Temperatures of the first and second assemblies are controlled by first heater 460 and second heater 465, respectively, in combination with thermocouple 470 and temperature controller 480. Poling structure 400 is positioned within poling chamber 402 having gas inlet 404 through which a nitrogen is passed to create an oxygen and moisture free environment.

Figure 5:
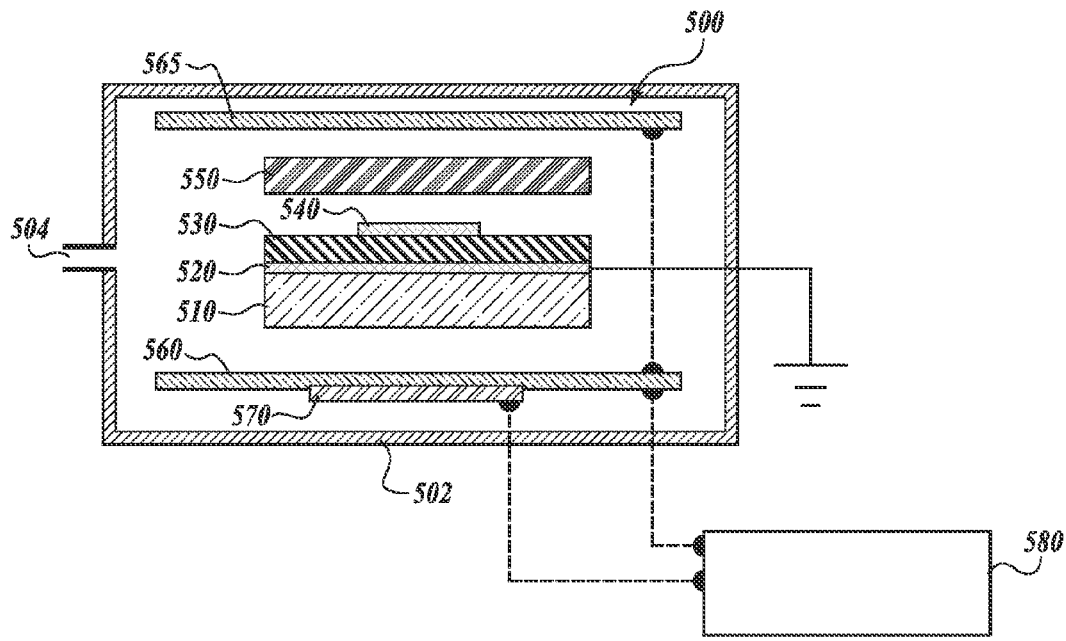
FIG. 5 is a cross-sectional view of a representative poling structure of the invention.

Referring to FIG. 5, poling structure 500 is provided having a first assembly comprising substrate 510, transparent first electrode 520 disposed on a surface of substrate 510 and connected to the ground, organic NLO material layer 530 disposed on a surface of first electrode 520 opposite the substrate 510, and second electrode 540 disposed on a surface of organic NLO material layer 530 opposite first electrode 520; and a second assembly comprising dielectric material 550 for generating a poling electrostatic field. Temperatures of the first and second assemblies are controlled by first heater 560 and second heater 565, respectively, in combination with thermocouple 570 and temperature controller 580. Poling structure 500 is positioned within poling chamber 502 having gas inlet 504 through which a nitrogen is passed to create an oxygen and moisture free environment.

Figure 6:
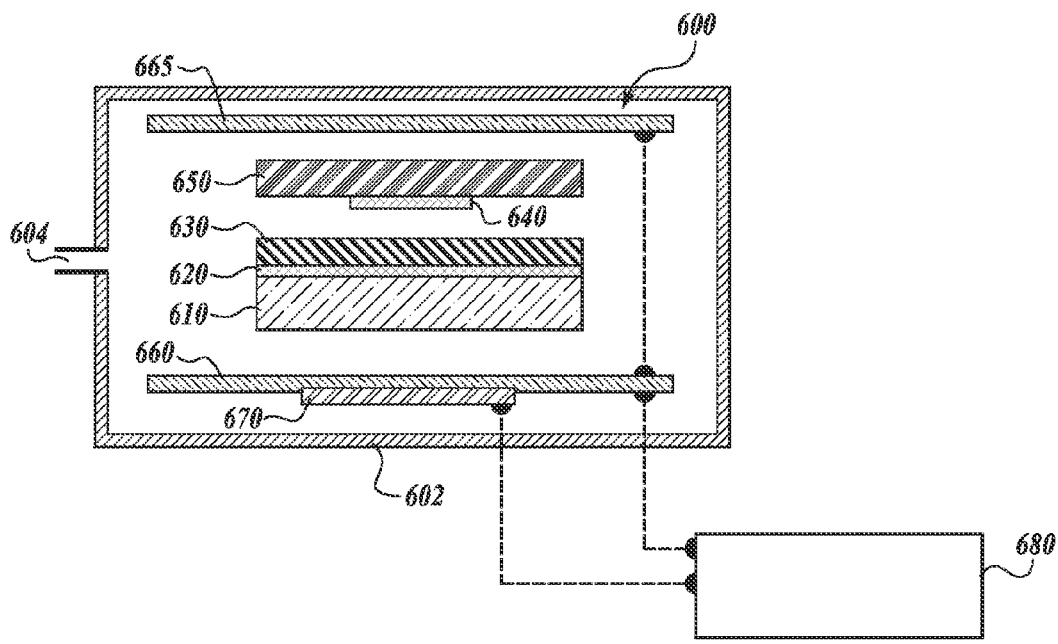
FIG. 6 is a cross-sectional view of a representative poling structure of the invention.

Referring to FIG. 6, poling structure 600 is provided having a first assembly comprising substrate 610, transparent first electrode 620 disposed on a surface of substrate 610, and organic NLO material layer 630 disposed on a surface of first electrode 620 opposite the substrate 610; and a second assembly comprising dielectric material 650 for generating a poling electrostatic field, and second electrode 640 disposed on a surface of dielectric material 650. Temperatures of the first and second assemblies are controlled by first heater 660 and second heater 665, respectively, in combination with thermocouple 670 and temperature controller 680. Poling structure 600 is positioned within poling chamber 602 having gas inlet 604 through which a nitrogen is passed to create an oxygen and moisture free environment.

Figure 7:
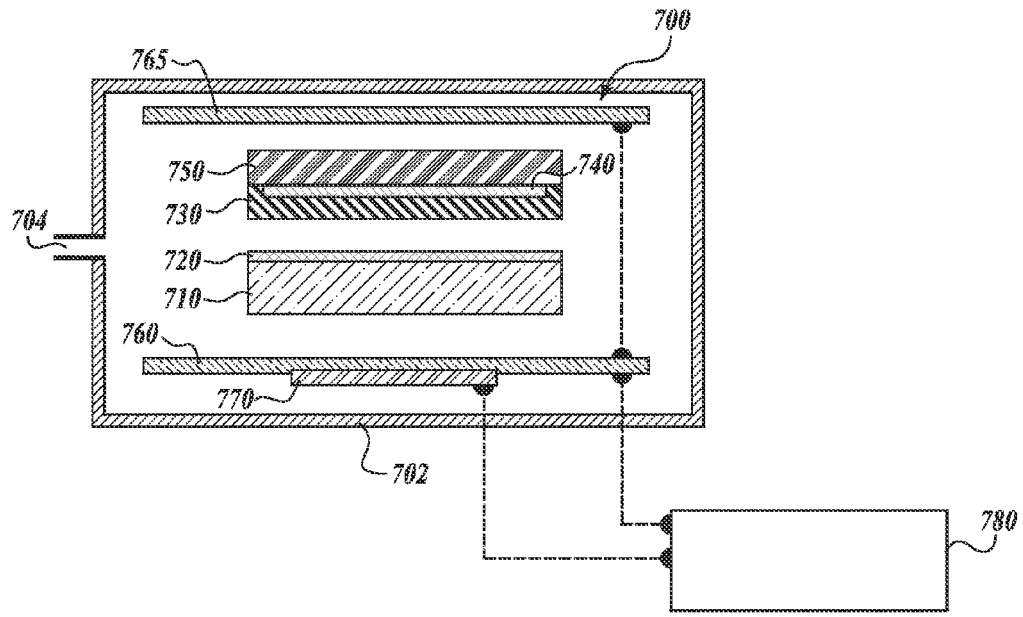
FIG. 7 is a cross-sectional view of a representative poling structure of the invention.

Referring to FIG. 7, poling structure 700 is provided having a first assembly comprising substrate 710, and transparent first electrode 720 disposed on a surface of substrate 710; and a second assembly comprising dielectric material 750 for generating a poling electrostatic field; second electrode 740 disposed on a surface of dielectric material 750, and organic NLO material layer 730 disposed on a surface of second electrode 740 opposite dielectric material 750. Temperatures of the first and second assemblies are controlled by first heater 760 and second heater 765, respectively, in combination with thermocouple 770 and temperature controller 780. Poling structure 700 is positioned within poling chamber 702 having gas inlet 704 through which a nitrogen is passed to create an oxygen and moisture free environment.

Figure 8:
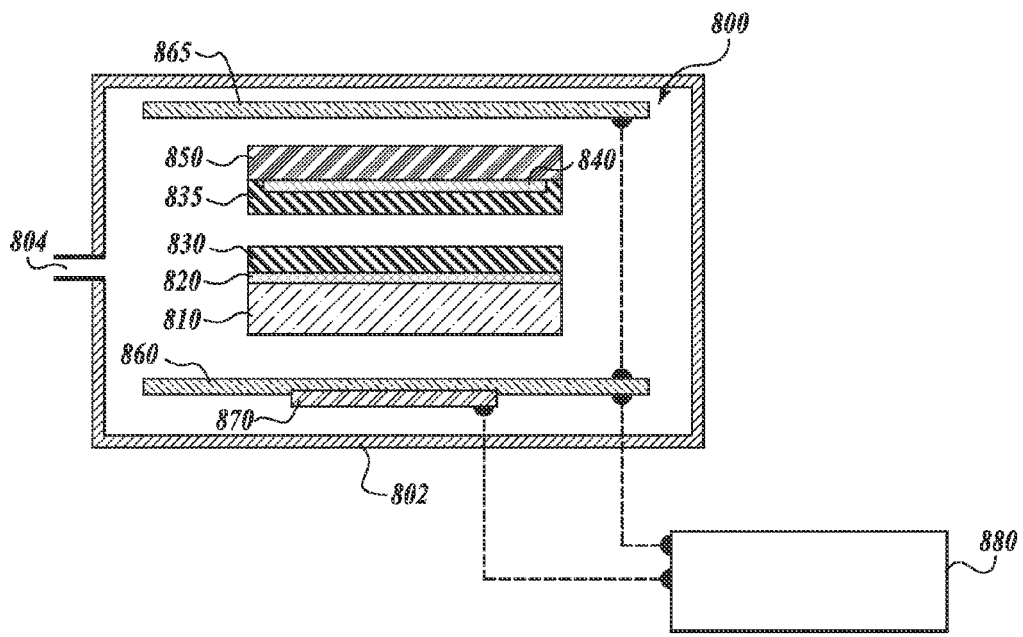
FIG. 8 is a cross-sectional view of a representative poling structure of the invention.

Referring to FIG. 8, poling structure 800 is provided having a first assembly comprising substrate 810, transparent first electrode 820 disposed on a surface of substrate 810, and organic NLO material layer 830 disposed on a surface of first electrode 820 opposite the substrate 810; and a second assembly comprising dielectric material 850 for generating a poling electrostatic field, second electrode 840 disposed on a surface of dielectric material 850, and second organic NLO material layer 835 disposed on a surface of second electrode 840 opposite dielectric material 850. Temperatures of the first and second assemblies are controlled by first heater 860 and second heater 864, respectively, in combination with thermocouple 870 and temperature controller 880. Poling structure 800 is positioned within poling chamber 802 having gas inlet 804 through which a nitrogen is passed to create an oxygen and moisture free environment.

Figure 9:
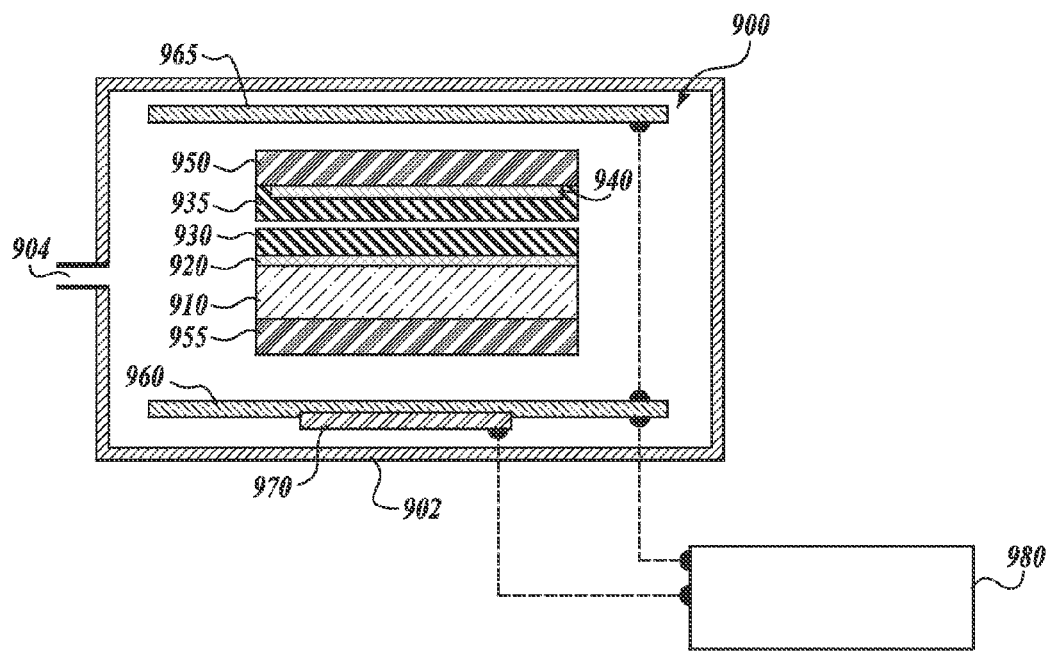
FIG. 9 is a cross-sectional view of a representative poling structure of the invention.

Referring to FIG. 9, poling structure 900 is provided having a first assembly comprising first dielectric material 955 having a first polarization direction, substrate 910 laminated on a surface of first dielectric material 955, transparent first electrode 920 disposed on a surface of substrate 910 opposite first dielectric material 955, and organic NLO material layer 930 disposed on a surface of first electrode 920 opposite the substrate 910; and a second assembly comprising second dielectric material 950 having the same polarization direction as first dielectric material 955 for generating a poling electrostatic field, second electrode 940 disposed on a surface of second dielectric material 950, and second organic NLO material layer 935 disposed on a surface of second electrode 940 opposite second dielectric material 950. Temperatures of the first and second assemblies are controlled by first heater 960 and second heater 965, respectively, in combination with thermocouple 970 and temperature controller 980. Poling structure 900 is positioned within poling chamber 902 having gas inlet 904 through which a nitrogen is passed to create an oxygen and moisture free environment.

Figure 10:
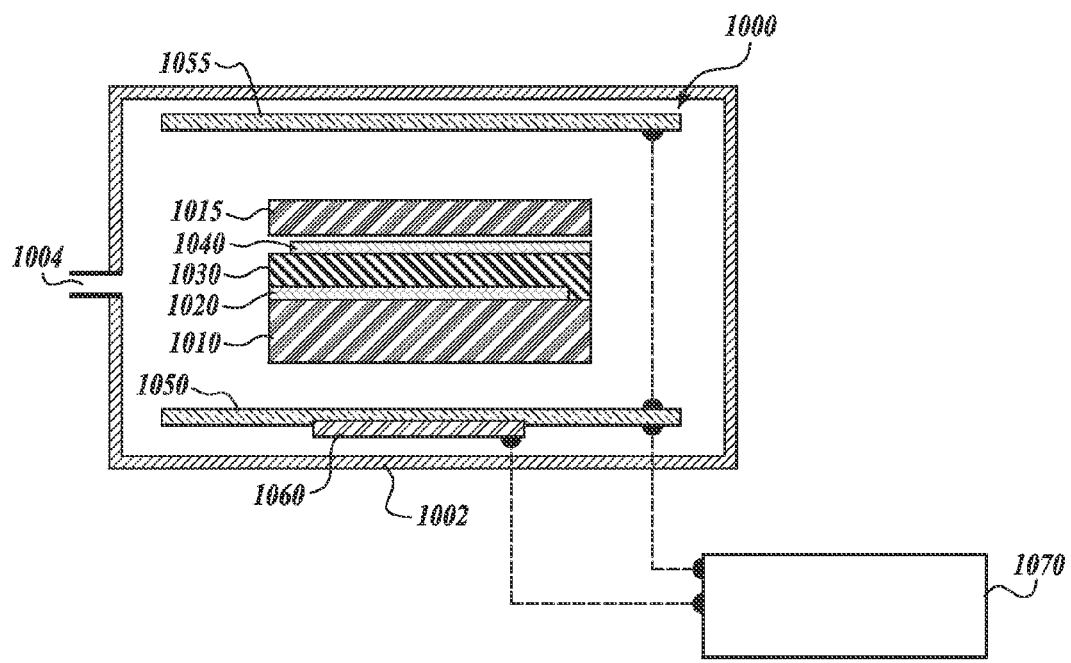
FIG. 10 is a cross-sectional view of a representative poling structure of the invention.

Referring to FIG. 10, poling structure 1000 is provided having a first assembly comprising first dielectric material substrate 1010 having a first polarization direction, first metal electrode 1020 having reflectivity of at least 99% disposed on a surface of first dielectric material substrate 1010, organic NLO material layer 1030 disposed on a surface of first electrode 1020 opposite first dielectric material substrate 1010, and second metal electrode 1040 having reflectivity of at least 99% disposed on a surface of organic NLO material layer 1030 opposite first metal electrode 1020; and a second assembly comprising second dielectric material 1015 having the same polarization direction as first dielectric material 1010 for generating a poling electrostatic field. Temperatures of the first and second assemblies are controlled by first heater 1050 and second heater 1055, respectively, in combination with thermocouple 1060 and temperature controller 1070. Poling structure 1000 is positioned within poling chamber 1002 having gas inlet 1004 through which a nitrogen is passed to create an oxygen and moisture free environment.

The composition of the substrate is not particularly limited. The substrate can be a semiconductor or insulator. For example, glass, silicon, gallium arsenide, indium phosphate or plastic may be used as the substrate. Preferably, the substrate is transparent with transmittance greater than 85% and has low dielectric loss.

The transparent first electrode can be made from any electroconductive metal or metal oxide. Representative metals useful for making the first electrode include gold, silver, chromium, titanium, aluminum, platinum, cobalt, copper, nickel, palladium, zinc, alloys thereof, and mixtures thereof. Representative metal oxides useful for making the first electrode include tin doped indium oxide, fluorine doped zinc oxide, aluminum doped zinc oxide, indium doped zinc oxide, antimony doped tin oxide, and fluorine doped tin oxide.

The second and third electrodes can be made from any electroconductive metal including gold, silver, chromium, titanium, aluminum, platinum, cobalt, copper, nickel, palladium, zinc, alloys thereof, and mixtures thereof, but is not limited thereto.

The metal electrodes with high reflectivity can be made from metals, such as gold and silver.

Suitable polar dielectric materials for generating electrostatic fields include any dielectric material having pyroelectric, piezoelectric, or ferroelectric properties. Representative dielectric materials include lithium niobate ($LiNbO_3$), lithium titanate ($LiTaO_3$), strontium niobate ($SrNbO_3$), barium niobate ($BaNbO_3$), barium titanate ($BaTiO_3$), triglycine sulfate (TGS), triglycine fluoberylate (TGFB), lead zirconate titanate (PZT), zinc oxide, sodium potassium tartrate tetrahydrate, and combinations thereof, and poly(vinylidene fluoride) and copolymers thereof.

Suitable organic NLO materials include any material containing NLO chromophores (e.g., D-to-A chromophore). Representative organic NLO materials include guest-host systems having a host polymer containing guest NLO chromophores, side-chain polymers with NLO chromophores, side-chain polymers with binary NLO chromophores, dendrimers containing NLO chromophores, crosslinkable polymers containing NLO chromophores, and crosslinkable dendrimers containing NLO chromophores.

In another aspect, the present invention provides methods for producing EO activity in organic NLO materials utilizing an electrostatic field generated from a polar dielectric material. The method for producing electro-optic activity in an organic NLO material includes subjecting an organic NLO material layer to the electrostatic field generated from the dielectric material at a temperature and for a time sufficient to produce at least some noncentrosymmetric order in the organic NLO layer to provide a layer having electro-optic activity.

The electrostatic field can be generated from a polar dielectric material having pyroelectric, piezoelectric or ferroelectric properties.

In one embodiment, the electrostatic field can be obtained by heating a pyroelectric or a ferroelectric material from room temperature to or above a $T_g$ of the organic NLO material or cooling the pyroelectric or the ferroelectric material from a temperature at or above $T_g$ of the organic NLO material to room temperature. The general methodology of using the pyroelectric or the ferroelectric material to pole an organic NLO material is as follows. First, the organic NLO material is brought close to the surface of the dielectric material by applying a pressure, then the NLO material/dielectric material stack is placed at a temperature either much lower than or much greater than the $T_g$ of the NLO material and allowing time sufficient to establish an equilibrium state of the dielectric material. In the case of the former, the NLO material/dielectric material stack is then heated to the $T_g$ of the NLO material. The heating process will disturb the dielectric material's spontaneous polarization from the equilibrium state and thus generate a net electrostatic field that polarizes the NLO material. Finally, the NLO material/dielectric material stack is cooled to room temperature. In the case of the latter, the NLO material/dielectric material stack is then directly cooled to room temperature passing $T_g$. The cooling process will also disturb the spontaneous polarization of the pyroelectric or ferroelectric material from the equilibrium state. Because the temperature starting point is higher than $T_g$ of the NLO material, the cooling and poling occurs simultaneously dynamically. When the temperature gets lower than $T_g$, poling is completed and the orientation is locked.

In another embodiment, the electrostatic field can be obtained by applying stress to a piezoelectric, a pyroelectric, or a ferroelectric material. A simple methodology of piezoelectric poling is as follows. First, the organic NLO material is heated to around its $T_g$, and then pressed against the surface of a dielectric material. The stress applied will trigger the polarization change of the dielectric material, thus generating an electrostatic field and starting the poling of NLO chromophores. Maintaining stress on and cooling the system to room temperature will freeze the induced noncentrosymmetric order of NLO chromophores and complete the poling. The stress and the dielectric material are removed after the poling.

In another embodiment, the electrostatic field can be obtained by applying electric field to a ferroelectric material to reverse its original polarization. Even though this approach does rely on an external voltage source, voltage is applied across the poling crystal rather than to the NLO material to be poled. This external electric field could combine with the heating/cooling process or stress to further enhance strength of the electrostatic field generated from the ferroelectric material.

Figure 11:
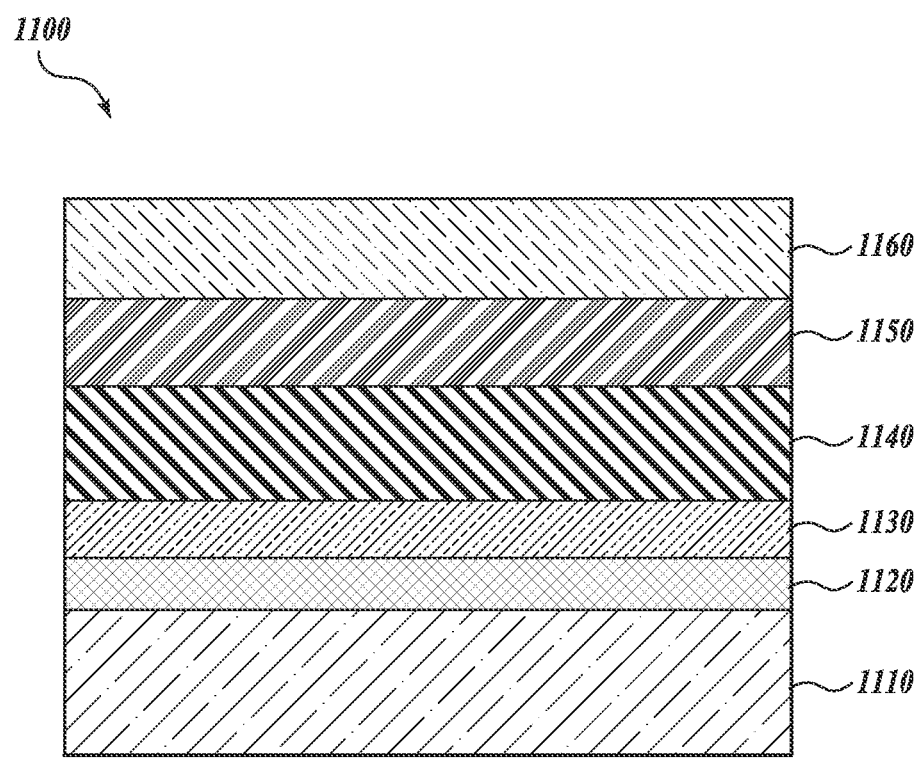
FIG. 11 is a cross-sectional view of a representative optical waveguide having the poled NLO material layer obtained by utilizing the poling structures and methods of the invention.

These poling structures and poling methods can be used to produce EO activity in optical waveguides containing organic NLO materials. FIG. 11 shows a cross-sectional view of a typical optical waveguide having a poled NLO material layer obtained by the poling structures and methods of the invention. Referring to FIG. 11, optical waveguide 1100 is provided having substrate 1110, first electrode 1120 formed on substrate 1100, first cladding layer 1130 formed on first electrode 1120, core layer of poled NLO material having EO activity 1140 formed on first cladding layer 1130, second cladding layer 1150 formed on core layer of poled NLO material 1140, and second electrode 1160 fanned on second cladding layer 1150.

In another aspect, the invention provides a method for making an optical waveguide comprising subjecting a film comprising an organic nonlinear optical material supported on a first electrode to an electrostatic field generated by a dielectric material at a temperature and for a time sufficient to produce at least some noncentrosymmetric order in the film to provide a film having electro-optic activity; removing the dielectric material for generating the poling electrostatic field from the film having electro-optic activity to provide a film having electro-optic activity supported on a first electrode; and forming a second electrode on the surface of the film having electro-optic activity opposite the first electrode to provide an optical waveguide. The method for making the optical waveguide can further include forming a first cladding layer intermediate the first electrode and the organic nonlinear optical material layer, and forming a second cladding layer intermediate the layer having electro-optic activity and the second electrode.

The optical waveguide can be used to fabricate a variety of EO devices, including EO modulators, optical switches, optical electric field sensors, and terahertz emitters.

The following are examples of electrostatic field poling utilizing the pyroelectric effect induced from spontaneous polarization change of a z-cut LiNbO$_3$ (LN) crystal according to the embodiments of the invention. According to the poling structure of FIG. 3, the NLO polymer was first spincast on an indium tin oxide (ITO) substrate and a gold electrode was sputtered on top to form a first assembly. A z-cut LN crystal was then pressed against the first assembly, and the assemblies were placed into the heating stage for thermal process. According to the poling structure of FIG. 4, the ITO electrode was connected to the backside of the LN crystal. According to the poling structure of FIG. 5, the ITO electrode was connected to the ground during the time the temperature of the assemblies were increased and then disconnected during the fast cooling process. In the poling structure of FIG. 6, the gold electrode was first sputtered on LN crystal, and then the NLO material was spin cast on ITO electrode. Immediately after spin casting, the LN crystal was pressed against the wet NLO film, making a close contact. A similar process was used for the poling structure of FIG. 7, but in this case, NLO material was directly spincast on LN crystal and ITO was pressed against it immediately.

A simple guest-host NLO material or a crosslinkable NLO material poled using these poling structures by heating the system from room temperature (r.t) to the $T_g$ of the NLO material gave an EO coefficient ($r_{33}$) ranging from 1 pm/V to 30 pm/V. According to the poling structures of FIGS. 3-7, either the ITO substrate or LN crystal was coated with the NLO material before pressing and heating. In order to achieve contact between the uncoated side and the NLO film side after hot press, the poling structures according to FIGS. 8-9 having both assemblies containing NLO material layers were developed. According to the poling structure of FIG. 8, the first NLO film was spincast on the ITO substrate in the first assembly and the second NLO film was spincast on LN crystal in the second assembly. The two assemblies with the NLO film facing each other were then pressed together. According to the poling structure of FIG. 9, a first LN crystal substrate in the first assembly which has the same polarization direction as that of the second LN crystal in the second assembly was used under ITO substrate to give more efficient field generation. At a temperature above 30° C. to 50° C. of the $T_g$ of the NLO material, the two NLO material films on both assemblies can be hot pressed against each other to form an integrated film, and then the NLO material was poled during the following cooling process. Using these poling structures, $r_{33}$ of 60 pm/V has been obtained in the guest-host systems. According to the poling structure of FIG. 10, the NLO material is poled by placing the second LN crystal on top of the Fabry-Perot etalon-type first assembly and subjecting the assembly to a high temperature equilibrium process. After poling, the second LN crystal was carefully removed and the Fabry-Perot etalon was measured for the EO coefficient. The $r_{33}$ value for the material produced by this method was estimated to be greater than 20 pm/V, corresponding to an effective $r_{33}$ value beyond 60 pm/V according to the isotropic model of poled polymers. The poling results under different poling structures and conditions are summarized in Table 1.

TABLE 1

Summary of poling results under different poling structures and conditions.

| Poling Structure | Heat Treatment | NLO Material | Measurement | EO activity |
|---|---|---|---|---|
| FIG. 3, FIG. 4, FIG. 5 | r.t. → $T_g$ → r.t. | Guest-host | Teng-Man | $r_{33}$~1-20 pm/V |
| FIG. 7 | r.t. → $T_g$ → r.t. | Guest-host or Crosslinkable | Teng-Man | $r_{33}$~30 pm/V |
| FIG. 8, FIG. 9 | r.t. → $T_g$ → r.t. | Guest-host | Teng-Man | $r_{33}$~60 pm/V |
| FIG. 8, FIG. 9 | >>$T_g$ → r.t. | Guest-host3, 4 | Teng-Man | $r_{33}$~60 pm/V |
| FIG. 10 | >>$T_g$ → r.t. | Guest-host | Fabry-Perot | $r_{13}$~20 pm/V ($r_{33}$~60 pm/V) |

While the preferred embodiment of the invention has been illustrated and described, it will be appreciated that various changes can be made therein without departing from the spirit and scope of the invention.

We claim:

1. A method for producing electro-optic activity in an organic nonlinear optical material, comprising:
   subjecting an organic nonlinear optical material to an electrostatic field generated by a dielectric material at a temperature and for a time sufficient to produce at least some noncentrosymmetric order in the material to provide a material having electro-optic activity, wherein the dielectric material is a pyroelectric or a ferroelectric material.

2. The method of claim 1, wherein the electrostatic field is generated by heating or cooling of the pyroelectric or the ferroelectric material.

3. The method of claim 1, wherein the noncentrosymmetric order in the organic nonlinear optical material is obtained during the heating process of the pyroelectric or the ferroelectric material and the organic nonlinear optical material.

4. The method of claim 3, wherein the organic nonlinear optical material is selected from the group consisting of a host polymer containing guest nonlinear optical chromophores, a side-chain polymer with nonlinear optical chromophores, a side-chain polymer with binary nonlinear optical chromophores, a dendrimer containing nonlinear optical chromophores, a crosslinkable polymer containing nonlinear optical chromophores, and a crosslinkable dendrimer containing nonlinear optical chromophores.

5. The method of claim 3, wherein the pyroelectric or the ferroelectric material and the organic nonlinear optical material are heated from room temperature to above a glass transition temperature or above a crosslinking temperature of the organic nonlinear optical material.

6. The method of claim 2, wherein the noncentrosymmetric order in the organic nonlinear optical material is obtained during the cooling process of the pyroelectric or the ferroelectric material and the organic nonlinear optical material.

7. The method of claim 6, wherein the organic nonlinear optical material is selected from the group consisting of a host polymer containing guest nonlinear optical chromophores, a side-chain polymer with nonlinear optical chromophores, a side-chain polymer with binary nonlinear optical chromophores, and a dendrimer containing nonlinear optical chromophores.

8. The method of claim 6, wherein the pyroelectric or the ferroelectric material and the organic nonlinear optical material are cooled from a temperature above a glass transition temperature of the organic nonlinear optical material to room temperature.

9. The method of claim 1, wherein the electrostatic field is generated from the pyroelectric or the ferroelectric material by applying stress to the pyroelectric or the ferroelectric material.

10. The method of claim 9, wherein the electrostatic field is applied while the organic nonlinear optical material layer is at a temperature above a glass transition temperature.

11. The method of claim 1, wherein the electrostatic field is generated from the ferroelectric material by applying an electric field to the ferroelectric material.

12. The method of claim 1, wherein the ferroelectric or pyroelectric material is lithium niobate, lithium titanate, strontium niobate, barium niobate, barium titanate, triglycine sulfate, triglycine fluoroberylate, lead zirconate titanate, zinc oxide, or sodium potassium tartrate tetrahydrate, and combinations thereof.

13. The method of claim 1, wherein the ferroelectric or pyroelectric material is a poly(vinylidene fluoride) or copolymer thereof.

* * * * *